United States Patent [19]
Strenke et al.

[11] Patent Number: 5,736,816
[45] Date of Patent: Apr. 7, 1998

[54] AUTOMATIC ON-OFF VEHICLE HEADLIGHT SYSTEM

[76] Inventors: LeRoy M. Strenke, 414 235th Ave.; Kenneth W. Strenke, 549 21st Ave., both of Cumberland, Wis. 54829

[21] Appl. No.: 669,177

[22] Filed: Jun. 24, 1996

[51] Int. Cl.[6] .................................................. B60Q 1/02
[52] U.S. Cl. ..................... 315/82; 315/80; 315/156; 307/10.1; 307/10.8
[58] Field of Search .................... 315/82, 83, 77, 315/78, 80, 156; 307/9.1, 10.1, 10.8, 121; 361/283, 285, 286, 287; 362/61

[56] References Cited

U.S. PATENT DOCUMENTS

| | | | |
|---|---|---|---|
| 2,158,428 | 5/1939 | Robertson | 123/146.5 |
| 3,769,519 | 10/1973 | Adamian | 307/10 LS |
| 3,857,373 | 12/1974 | Martin et al. | 123/117 A |
| 4,684,819 | 8/1987 | Haag et al. | 315/82 X |
| 5,030,884 | 7/1991 | Roussey et al. | 315/83 |
| 5,081,565 | 1/1992 | Nabha et al. | 315/82 X |
| 5,418,429 | 5/1995 | Laman | 315/82 |
| 5,614,788 | 3/1997 | Mullins et al. | 315/82 |

*Primary Examiner*—Robert Pascal
*Assistant Examiner*—Haissa Philogene
*Attorney, Agent, or Firm*—James W. Miller

[57] ABSTRACT

A control system for automatically turning on and off at least some of the lights of a vehicle, such as an automobile. The control system includes a vacuum switch connected to a vacuum source on the engine. A vacuum delay valve is interposed between the vacuum source and the vacuum switch. When the engine is running, a vacuum produced at the vacuum source will actuate the vacuum switch to close a set of normally open contacts. When the contacts close, a source of electrical power is connected to at least the low beams of the headlights to illuminate the low beams during the operation of the engine without intervention by the driver. The vacuum delay valve ensures that intermittent interruptions of the vacuum at the source, e.g. as might be caused by vehicle acceleration, will not open the vacuum switch when the engine is still running.

18 Claims, 1 Drawing Sheet

AUTOMATIC ON-OFF VEHICLE HEADLIGHT SYSTEM

TECHNICAL FIELD

This invention relates to a control system for automatically turning on and off some of the lights of a vehicle, including at least the headlights of the vehicle, whenever the engine of the vehicle is running, to thereby increase safety.

BACKGROUND OF THE INVENTION

Vehicles such as automobiles, trucks and the like have various lights that are used during the operation of the vehicle. Chief among these are the vehicle's headlights which illuminate the road in front of the vehicle. In addition, the vehicle has various running lights that illuminate the front and rear of the vehicle including a set of taillights at the rear of the vehicle. Use of the headlights and running lights is necessary for the safe operation of the vehicle at night.

The vehicle lights described above are also desirably used at times other than at night. For example, many states have laws which require the use of the headlights during precipitation, i.e. when it is raining or snowing. As a practical matter, use of these lights at all times during operation of the vehicle is preferred from a safety standpoint. Even during broad daylight, it is easier for another driver to see another vehicle if the vehicle's headlights and/or taillights are illuminated.

In conventional vehicles, the headlights and running lights are usually controlled by a manually operable on/switch, often placed in a stalk on the steering column. The driver of the vehicle must rotate the stalk to manually turn the lights on and then off. The stalk also controls the high and low beams of the headlights, which again are manually selectable by the driver. Unfortunately, leaving the lights entirely under the manual control of the driver often means that they are rarely used during daylight. Indeed, sometimes a driver forgets to turn the lights on at night, especially when the vehicle is being operated along a well lit urban street.

Another problem associated with the use of wholly manual control of the vehicle's lights is the inadvertent failure to turn the lights off when the vehicle is stopped. This is particularly true on vehicles which lack a warning chime or bell to alert the driver that the lights are still on as the driver exits the vehicle. Such vehicles still exist and are being sold today. If the driver leaves the vehicle for any length of time, then the current draw from the lights that are still illuminated will drain the vehicle's battery. Accordingly, it may be impossible to restart the vehicle when the driver next attempts to do so.

The problem of draining the battery as a consequence of forgetting to turn the lights off has been recognized in the vehicle art. Various solutions to this problem have been proposed. For example, in U.S. Pat. No. 2,158,428, a battery isolating switch is disclosed which disconnects the battery from the vehicle electrical system after the engine stops running. The switch is kept actuated both by the vacuum produced by the engine and by the current produced by the generator of the engine to prevent inadvertent disconnection of the battery while the engine is operating. Other battery disconnection switches are known in the art.

While the Robertson device comprises an automatic system for turning the lights off should they be left on inadvertently, it does not automatically initially turn the lights on. All it does is connect and disconnect the battery to the vehicle electrical system. Thus, the driver would still have to manually turn the lights on for the lights to be effective. Thus, Robertson does not address the problem of helping a driver obtain automatic operation of the lights.

Some systems are known which will automatically turn the lights on. One such system is shown in U.S. Pat. No. 3,769,519 to Adamian. Such a system electronically monitors both the ignition system of the engine to detect when engine operation commences and the ambient light level to tell if it is light or dark. The Adamian system will automatically turn the lights on if the engine starts operating and if the ambient light level is at some preset level. However, such a system is complex requiring the use of many electrical and electronic components and sensors which add unduly to its cost and detract from its reliability. This has prevented such systems from coming into widespread use.

SUMMARY OF THIS INVENTION

One aspect of this invention is to provide a system for automatically turning on and off certain lights in a vehicle which is simple, durable and easy to install or add to a vehicle. The system of this invention does not use any electrically operated solenoids or solenoid switches and, in fact, uses a non-electrical force developed by the engine to operate. Thus, the system of this invention is not prone to shorts or the like and is very reliable in operation. It can also easily be added to an existing automobile.

These and other aspects of this invention are provided by a control system for automatically turning on and off at least the headlights of a vehicle. The vehicle is of the type having an engine for propelling the vehicle and a manually controlled system for allowing the driver to manually turn the headlights on and off. The control system of this invention comprises a switch for making and breaking an electrical connection between an electrical power source carried on the vehicle and at least one of the beams of the vehicle's headlights. The switch is operated by a non-electrical force that is generated only when the engine is running such that the at least one headlight beam is automatically turned on and off when the engine of the vehicle is running or is not running, respectively. The switch operates independently of the manually controlled system for turning the headlights on and off.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
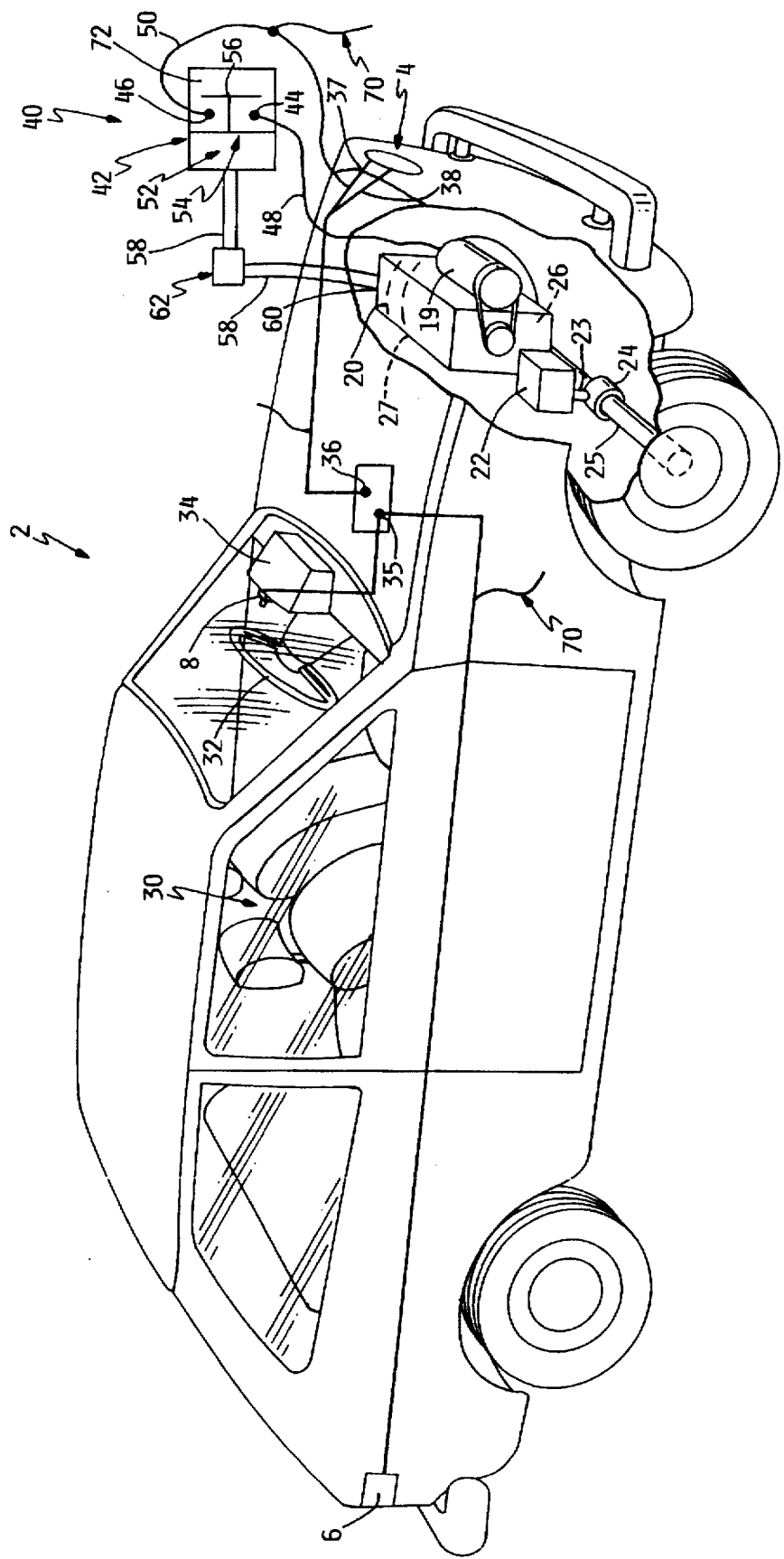
FIG. 1 is a diagrammatic or schematic view of the system of this invention which automatically turns on and off certain lights, such as the headlights, of a vehicle, showing the system of this invention installed on a typical vehicle.

This invention comprises a control system 40 for turning on and off certain lights of a vehicle 2, such as an automobile or truck. The lights being controlled include at a minimum the headlights 4 of vehicle 2. In addition, the lights being controlled further preferably include the taillights 6 of vehicle 2. Thus, whenever the engine of vehicle 2 starts running, headlights 4 and taillights 6 of vehicle 2 are illuminated by control system 40. Whenever the engine of vehicle 2 stops running, headlights 4 and taillights 6 of vehicle 2 are extinguished.

Vehicle 2 depicted herein is one which would have a manually operable switch 8 for manually turning headlights 4 and taillights 6 on and off, i.e. a stalk type switch on the steering column or some other similar switch. Such a switch 8 would also typically turn on the other running lights of vehicle 2 and the dash lights, and allow the user to select high beams or low beams of headlights 4. Such a manual on/off switch 8 is part of vehicle 2 as such vehicle comes from the manufacturer. In other words, such a manual on/off switch 8 and the rest of the system for the operation of headlights 4 and taillights 6 are original equipment on vehicle 2.

Control system 40 of this invention is entirely independent of this usual on/off switch 8 and vehicle lighting system. Thus, control system 40 of this invention operates the controlled lights entirely automatically of the operation of on/off switch 8. It is irrelevant whether or not the on/off switch 8 has been activated by the driver as control system 40 will still light at least certain of the vehicle lights.

Vehicle 2 depicted in FIG. 1 is meant to show any typical vehicle, specifically an automobile. Vehicle 2 includes an internal combustion engine 20 that drives a generator or alternator 19 for supplying power to the vehicle's electrical system. This power is used to drive the electricity consuming components of the vehicle directly and/or is used to recharge the vehicle's battery (not shown). A transmission 22 couples the output shaft of the engine to separate drives axles 25 and 26 that rotate the front wheels 27 of vehicle 2. Thus, vehicle 2 shown in FIG. 1 is a front wheel drive automobile.

Vehicle 2 includes a passenger compartment 30 with a steering wheel 32 that the driver uses to guide vehicle 2. The passenger compartment 30 includes an instrument panel or cluster 34 somewhere adjacent steering wheel 32. The manual on/off switch 8 used to turn the headlights 4 and taillights 6 on and off is located somewhere adjacent steering wheel 32, i.e. either a separate switch 8 on instrument cluster 34 as shown in FIG. 1 or a stalk (not shown) extending out from the column on which the steering wheel is mounted. On/off switch 8 is generally a two position switch, having a first contact 35 for placing the running lights, including taillights 6 into operation, and a further contact 36 for also activating headlights 4. However, only a single position switch 8 in which both the running lights and headlights 4 are simultaneously activated could be used.

Headlights 4 used on vehicle 2 include at least one set of headlights on each side of vehicle 2. Only one headlight set on the left side of vehicle 2 is shown in FIG. 1., with it being understood that an identical headlight set is used on the other side of vehicle 2. The headlight set as shown comprises a single headlight 6 having high and low beam filaments which are actuated by high and low beam leads 37 and 38, respectively, from the manually operated lighting system. When power is supplied to the low beam lead 37, only the low beam of headlight 6 is lit. When power is supplied to both the low and high beam leads 37 and 38, both the low and high beams are simultaneously lit, providing high beam forward illumination. The driver can selectively choose either low or high beam illumination, respectively, by causing either the low beam filament to be lit or by causing both filaments to be lit simultaneously by selective manipulation of the manual on/off switch 8 in a known manner.

Some vehicles 2 provide low and high beam illumination by providing two headlights 6 in each set of headlights on each side of vehicle 2, rather than using two filaments in a single headlight 6. It is unimportant to this invention which system is used, i.e. whether the dual filament or dual headlight system is used.

Similarly to headlights 4, taillights 6 are most often provided in two identical sets on either side of the car. Only the left taillight 6 is shown in FIG. 1. with an identical taillight 6 being provided on the other side of the car. Usually, taillights 6 are included in a running light circuit that may include other running lights on vehicle 2. For example, the front of vehicle 2 may have side lights on either side of vehicle 2 or additional running lights on the front of vehicle 2 that are separate from headlights 4. As noted, the manual on/off switch 8 usually provides for activation of the running lights separately from headlights 4 depending upon which position the multi-position switch 8 is moved to.

As described thus far, vehicle 2 herein is meant to illustrate a typical vehicle as is known in the automotive art. This invention relates to an automatic on/off control system 40 which will automatically turn on and off at least some of the vehicle lights in accordance with the operation of engine 20 of vehicle 2. Control system 40 is independent of the normal manually controlled system that usually activates the lights of vehicle 2. Thus, whatever lights are controlled by control system 40 of this invention will be lit whenever engine 20 is running whether or not the manual on/off switch 8 has been manipulated to turn the lights on.

Control system 40 of this invention includes a vacuum operated, make or break switch indicated generally as 42. Vacuum switch 42 includes a set of electrical contacts 44 and 46. One contact 44 is wired by a first lead 48 into a source of electrical power on vehicle 2, namely to the ignition coil or to alternator 19 to any other suitable source. The other contact 46 is wired by a second lead 50 to at least one of the beams of headlights 4, preferably to low beam lead 37. Switch 42 is of the normally open type so that no electrical connection is normally made between contacts 44 and 46. Preferably, switch 42 can include a spring or other type of biasing means (not shown) for biasing switch 42 into its open position. The open position of switch 42 is shown in FIG. 1.

Vacuum switch 42 includes a vacuum chamber 52 therein for exerting a vacuum against a movable piston or diaphragm 54. When a vacuum is applied to chamber 52, as from engine 20 during operation of engine 20, movable diaphragm 54 is pulled to the left in FIG. 1 as illustrated by the arrow A until a conductive arm 56, fixed in some fashion to movable diaphragm 54 for movement therewith, is brought into a bridging engagement with the two contacts 44 and 46. Thus, switch 42 has now made the connection between contacts 44 and 46 and electricity is now free to flow from the electrical power source 19 on vehicle 2 through the now closed contacts 44 and 46 of vacuum switch 42 to the low beam lead 37 of the vehicle's headlights, thus illuminating the low beam of headlights 4. The illumination of the low beams of headlights 4 will continue for as long as the contacts 44 and 46 are bridged by conductive arm 56 of vacuum switch 42, namely for as long as sufficient vacuum is applied to vacuum chamber 52 of switch 42. While the second lead 50 has been shown extending to the low beam lead 37 of only one set of the vehicle's headlights, this low beam lead 37 is part of an electrical circuit that is wired to the low beam lead of the other set of the vehicle's headlights 4 on the other side of vehicle 2, to simultaneously light both headlights 4 on both sides of vehicle 2.

Rubber hoses 58 or the like are used to connect vacuum switch 42 to a suitable source of vacuum on engine 20. In this regard, the word "vacuum" as used in this patent application will mean any source of reduced pressure provided by the operation of engine 20 that is below atmospheric pressure and that is capable of drawing diaphragm 54 in switch 42 to the left in FIG. 1. Thus, vacuum switch 42 could be connected to the intake manifold of engine 20 or to any vacuum hose that is already present on engine 20.

While vacuum switch 42 could be connected directly to a vacuum source on vehicle 2, the vacuum source being depicted generally as 60, the Applicants have found that vacuum source 60 is not always reliably present during the operation of engine 20. There are times during the operation of engine 20, principally during acceleration of an internal combustion engine, where vacuum source 60 weakens or disappears so that the vacuum in vacuum chamber 52 of switch 42 would degrade to such an extent that switch 42 would open while vehicle 2 was still running. While vehicle 2 would still operate properly as the ignition system is entirely independent of control system 40 of this invention, the lights controlled by system 40 would blink off and then back on when vacuum source 60 strengthened. This possible intermittent operation of vacuum switch 42 is not preferred.

To solve this problem, control system 40 of this invention interposes a vacuum delay valve 62 in the rubber hoses 58 used to connect vacuum switch 42 to vacuum source 60, i.e. between vacuum source 60 and vacuum switch 42. Vacuum delay valve 62 serves as a vacuum reservoir so that any interruption of the vacuum at engine 20 will not be directly transmitted to vacuum switch 42 but will be delayed for a period of time that is sufficiently long to get past any of the typical interruptions that might occur because of vehicle acceleration. One type of vacuum delay valve that Applicants have used provides a 47 second delay. In other words, vacuum source 60 at vehicle 2 can be interrupted for up to 47 seconds before this interruption is seen by vacuum switch 42.

The electrical power source 19 on vehicle 2 to which vacuum switch 42 contact is connected can be any convenient source, including the vehicle's battery. Preferably, however, it is some source that is energized by the operation of engine 20, such as the ignition coil or the lighting coil that is sometimes formed as part of alternator 19. Thus, the first lead 48 from first contact 44 is shown as extending to alternator 19 only to show a connection to some source of electrical power on vehicle 2.

The operation of control system 40 of this invention should be apparent. As soon as engine 20 of vehicle 2 is started and begins running, the vacuum produced by engine 20 will be applied through vacuum delay valve 62 and then to vacuum switch 42. The vacuum applied to vacuum chamber 52 will cause diaphragm 54 to move to the left until the contacts 44 and 46 are closed by conductive arm 56. When this occurs, electrical power from one of the coils of alternator 19 can flow through switch 42 to the low beams of headlights 4, turning headlights 4 on automatically. All of this happens without any effort on the part of the driver, other than for starting engine 20, and without having to manipulate the normal on/off switch 8 used to control the vehicle's lights. It will happen in daylight or at night wholly automatically, thus contributing to the safe operation of vehicle 2 and overcoming any inadvertent failure of the driver to turn the lights on.

Normal decreases in vacuum occasioned by operation of engine 20 will not open switch 42 due to the use of vacuum delay valve 62. Thus, temporary and minor fluctuations in vacuum, due to vehicle acceleration, will not affect switch 42 as vacuum delay valve 62 keeps sufficient vacuum in vacuum chamber 52 of switch 42. However, once vehicle 2 stops and engine 20 shuts off, thus permanently removing the source of vacuum, vacuum delay valve 62 will only keep vacuum in switch 42 for the delay period of the valve, e.g. for approximately 47 seconds. Thereafter, the vacuum in the vacuum chamber 52 of switch 42 will degrade until atmospheric pressure is restored in chamber 52, thus causing diaphragm 54 to move to the right to disengage conductive arm 56 from contacts 44 and 46, thus opening switch 42 and shutting off the lights controlled by switch 42.

If he or she wishes, the driver can independently 6 actuate the lights using the usual lighting system including the manual on/off switch 8. Thus, if engine 20 is off and the driver wants headlights 4 illuminated, he or she can do so by turning the lights on using the manual on/off switch 8. In addition, switch 8 would be used to enable actuation of the high beams or any of the other lighting systems, such as the dashboard lights, that are controlled by the manual on/off switch but that are not available using control system 40.

While control system 40 of this invention has been disclosed as being connected to the low beams of headlights 4, it would be easy and quite feasible to also wire it to at least some of the vehicle's running lights as well. Thus, a jumper wire 70 (shown broken apart in FIG. 1 for clarity) connects the second lead 50 from vacuum switch 42 to the lead that powers taillights 6 of vehicle 2. Thus, control system 40 of this invention can automatically turn on and off both the low beams of headlights 4 and at least taillights 6 of vehicle 2. This will further increase safety by causing at least some of the running lights to always be illuminated as well as some portion of headlights 4. If desired, all of the vehicle's running lights could be illuminated in this fashion.

One aspect of control system 40 of this invention is the fact that vacuum switch 42 is non-electrically powered, but is operated by a fluid source that is normally produced by the operation of engine 20, i.e. by the vacuum produced by engine 20. Thus, switch 42 can be a simple make or break type switch having a single pair of contacts that are closed or opened, and need not be a solenoid operated switch. Vacuum switch 42 is inexpensive, durable and reliable in operation. Furthermore, it itself consumes no power to open or close, thus decreasing the electrical load on vehicle 2 from what it would have been had switch 42 been an electrically actuated switch.

While the make or break switch 42 of control system 40 has been disclosed as being a vacuum switch, i.e. one operated by a source of reduced pressure created by an engine, some engines used in some vehicles, such as Diesel engines, do not reliably create a vacuum when they operate. Instead, they create a source of increased pressure, i.e. pressure above atmospheric, during operation. For example, the increased presssure of a Diesel engine is often stored in an air tank. In such a case, control system 40 of this invention would still be fully applicable to such an engine as long as the increased pressure source is connected to that part of switch 42 that would cause switch 42 to close when the increased pressure is present, i.e. the rubber hose would be connected to chamber 72 on the other end of switch 42 to cause the diaphragm to move to the left, and to close, when increased pressure is applied to chamber 72. The connection to switch 42 would be from the storage air tank with the air tank serving as the delay valve to even out any fluctuations in this increased pressure and to delay any intermittent interruptions in this pressure from affecting the operation of control system 40. A pressure regulator would be used to lower the pressure of the air in the air tank, i.e. a couple of hundred pounds or so, to a lower value, i.e. thirty pounds or so, that would be more appropriately applied to switch 42.

Vacuum switch 42 and vacuum delay valve 62 are components that are well known in the automotive art used for a variety of purposes. One example of a vacuum switch 42 that would function for the purposes of this invention is the vacuum switch made by Air-Logic Co., Model No. V-5100-28-FM. A similar pressure switch is made by Air-Logic Co., Model No. P-5100-28-FM that would be used in a case of increased pressure as provided by a Diesel engine. The vacuum delay valve 62 is manufactured by Echlin and provides, as noted earlier, a 47 second delay.

Control system 40 of this invention will illuminate the lights whenever the engine of vehicle 2 is running. In some cases, this may not be desirable. For example, a Diesel engine might idle for long periods of time without the driver wishing to have the lights lit, or a police car might desirably be driven without having the lights lit. Thus, it would be possible to use a vacuum switch 42, or its corresponding pressure switch, having an on/off toggle or control to disable the operation of the switch to prevent the lights from lighting during engine operation.

Various modifications of this invention will be apparent to those skilled in the art. For example, while control system 40 is shown as illuminating only the low beams of headlights 4, the second lead 50 from switch 42 could be split and connected to both the high and low beam leads 37 and 38 to provide simultaneous actuation of both. However, this is not preferred, since high beam illumination at night is not always desired and since one would always have both high and low beam illumination in this scenario. In addition, the driver can still get high beam illumination simply by using the normal lighting system of vehicle 2 and the appropriate manipulation of on/off switch 8. Accordingly, this invention is to be limited only by the appended claims.

We claim:

1. A control system for automatically turning on and off at least the headlights of a vehicle, the vehicle having an engine for propelling the vehicle and a manually controlled control system for allowing the driver to manually turn the headlights on and off, which comprises:

(a) a switch for making and breaking an electrical connection between an electrical power source carried on the vehicle and at least one of the beams of the vehicle's headlights, whereby the switch is operated by a non-electrical force that is generated only when the engine is running such that the at least one headlight beam is automatically turned on and off when the engine of the vehicle is running or is not running, respectively, without requiring any electrical power for the actuation of the switch;

(b) wherein the switch operates independently of the manually controlled control system for turning the headlights on and off (c) wherein the non-electrical force is provided by a source on the engine which is subject to intermittent degradation in the value or amount of the force during normal operation of the engine, and further including means interposed between the source of the non-electrical force and the switch for preventing such intermittent degradations in value from affecting the operation of the switch.

2. The control system of claim 1, wherein the switch is connected to the low beams of the vehicle's headlights.

3. The control system of claim 1, wherein the switch is further connected to the vehicle's taillights to automatically turn the taillights on and off along with the at least one beam of the headlights.

4. The control system of claim 3, wherein the switch is connected to the low beams of the vehicle's headlights.

5. The control system of claim 1, wherein the switch is a pressure operated switch connected to a source of reduced pressure on the vehicle with the reduced pressure source comprising the non-electrical actuating force of the switch.

6. The control system of claim 5, further including a delay valve interposed between the pressure operated switch and the reduced pressure source on the vehicle, the delay valve comprising a reservoir of reduced pressure that prevents intermittent decreases in the reduced pressure at the reduced pressure source from opening the switch for a delay period determined by the capacity of the reservoir.

7. The control system of claim 6, wherein the delay period is set to be sufficiently long to exceed the intermittent decreases in the reduced pressure that might occur during acceleration of the vehicle.

8. The control system of claim 7, wherein the delay period is set to be in excess of forty five seconds.

9. The control system of claim 1, wherein the electrical power source comprises an electricity generating coil driven by the engine.

10. A control system for automatically turning on and off at least the headlights of a vehicle, the vehicle having an engine for propelling the vehicle and a manually controlled control system for allowing the driver to manually turn the headlights on and off, which comprises:

(a) a vacuum switch for making and breaking an electrical connection between an electrical power source carried on the vehicle and at least one of the beams of the vehicle's headlights, wherein the vacuum switch operates independently of the manually controlled control system for turning the headlights on and off, wherein the vacuum switch is operated by a source of vacuum that is generated by the engine when the engine is running such that the at least one headlight beam is automatically turned on and off when the engine of the vehicle is running or is not running, respectively; and (b) a vacuum delay valve between the vacuum switch and the vacuum source to provide for continued actuation of the vacuum switch for some period of time after an interruption in the vacuum at the vacuum source.

11. A vehicle having a control system for automatically turning on and off at least some of the lights of the vehicle, the vehicle having an engine for propelling the vehicle, which comprises:

(a) a set of headlights on the front of the vehicle and various running lights on the vehicle including a set of taillights on the rear of the vehicle;

(b) a first manually controlled control system for allowing the driver of the vehicle to turn the headlights and running lights on and off at the driver's discretion;

(c) a second control system for automatically turning at least the headlights of the vehicle on and off automatically only in accordance with the operation of the engine and independently of the operation of the first manual control system, wherein the second control system is solely responsive to the operation of the vehicle's engine such that the vehicle's headlights are always illuminated when the engine is operating regardless of whether or not the first manually controlled control system has been used to illuminate the headlights and regardless of ambient environmental conditions; and (d) wherein the second control system is actuated by a non-electrical force generated by the engine of the vehicle when the engine is being operated such that the second control system is actuated and remains actuated without consuming any electrical power from an electrical system of the vehicle.

12. The vehicle of claim 11, wherein the non-electrical force is a force provided by a source of fluid created by the engine during the operation thereof.

13. The vehicle of claim 12, wherein the fluid source comprises a source of air that is at reduced pressure compared to atmospheric pressure.

14. The vehicle of claim 11, wherein the second control system illuminates the headlights using a source of electrical power that is generated only when the engine is operating.

15. The vehicle of claim 14, wherein the electrical power source comprises an electricity generating coil driven by the operation of the engine.

16. The vehicle of claim 11, wherein the second control system illuminates at least one of the beams of a multiple beam headlight.

17. The vehicle of claim 16, wherein the second control system illuminates the low beam of the headlights.

18. The vehicle of claim 16, wherein the second control system illuminates the taillights of the vehicle.

* * * * *